United States Patent [19]

Okisu et al.

[11] Patent Number: 5,084,611
[45] Date of Patent: Jan. 28, 1992

[54] DOCUMENT READING APPARATUS FOR DETECTION OF CURVATURES IN DOCUMENTS

[75] Inventors: Noriyuki Okisu, Amagasaki; Shinya Matsuda, Kyoto; Toshihiko Karasaki, Kawachinagano, all of Japan

[73] Assignee: Minolta Camera Kabushiki Kaisha, Osaka, Japan

[21] Appl. No.: 588,652

[22] Filed: Sep. 26, 1990

[30] Foreign Application Priority Data

Sep. 29, 1989 [JP] Japan .................. 1-256098

[51] Int. Cl.$^5$ ............................. H01J 40/14
[52] U.S. Cl. .................. 250/208.1; 250/561
[58] Field of Search .......... 250/214 R, 561, 208.1; 356/377; 358/486, 488, 491, 493

[56] References Cited

U.S. PATENT DOCUMENTS 3,621,222 11/1971 Minami ..................... 356/377
4,276,561 6/1981 Friedman .................. 358/493
4,811,114 3/1989 Yamamoto et al. .......... 358/493

FOREIGN PATENT DOCUMENTS 62143557 6/1989 Japan .

Primary Examiner—David C. Nelms
Assistant Examiner—K. Shami
Attorney, Agent, or Firm—Price, Gess & Ubell

[57] ABSTRACT

A document reading apparatus comprising a document table, a reading section disposed above the document table for reading a document, e.g. an opened book, placed on the document table, and a linear light source for emitting light to the opened book at an angle thereto. The reading section includes a sensor for detecting an image of the light emitted to the book. This image displays a brightness distribution over surfaces of the opened book including curvatures adjacent the joint. The brightness distribution is used as a reference for rectifying an image signal corresponding to the opened book when the document image is reproduced.

15 Claims, 10 Drawing Sheets

IMAGE SEEN VERTICALLY

IMAGE SEEN VERTICALLY

FIG.4c

IMAGE SEEN VERTICALLY

FIG.12a

DOCUMENT READING APPARATUS FOR DETECTION OF CURVATURES IN DOCUMENTS

TECHNICAL FIELD

The present invention relates to a document reading technique for reading a document as image information.

BACKGROUND OF THE INVENTION

Documents to be read by a document reading apparatus include those bound in book form. Such a document usually includes curved paper surface regions adjacent a joint. When this document is read for reproducing image data as it is, images adjacent the joint become compressed, resulting in distorted images.

A countermeasure to this inconvenience is disclosed in a Japanese patent application laid open under No. 62-143557. The prior apparatus disclosed in this publication comprises a line sensor for scanning and reading a document, and a distance sensor for detecting distances to a document surface. The line sensor is caused to read the document with varied pitches in an auxiliary scanning direction in accordance with distances detected during a reading operation.

However, the construction for effecting correction during a document reading operation is applicable only to an apparatus employing a scan type image reader. This construction has a further disadvantage of being unable to cope with curvatures in other directions than the auxiliary scanning direction.

SUMMARY OF THE INVENTION

An object of the present invention is to provide a document reading technique for realizing a correct image reproduction without utilizing a scan type image reader, which technique detects the way in which the document is curved during a document reading operation, and rectifies image data during a reproducing operation based on the curvatures detected.

The above object is fulfilled, according to the present invention, by a document reading apparatus comprising document reading means for reading a document and outputting an image signal; light emitting means for emitting light to the document; detecting means for detecting an image of the light emitted from the light emitting means to the document and for judging curvatures of the document; and rectifying means operable in response to the detecting means for rectifying the image signal received from the document reading means.

In a preferred embodiment of the invention, the document reading apparatus further comprises brightness distribution detecting means for detecting a brightness distribution of the document. The brightness distribution resulting from the document curvatures may be used as a basis for rectifying the image information.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
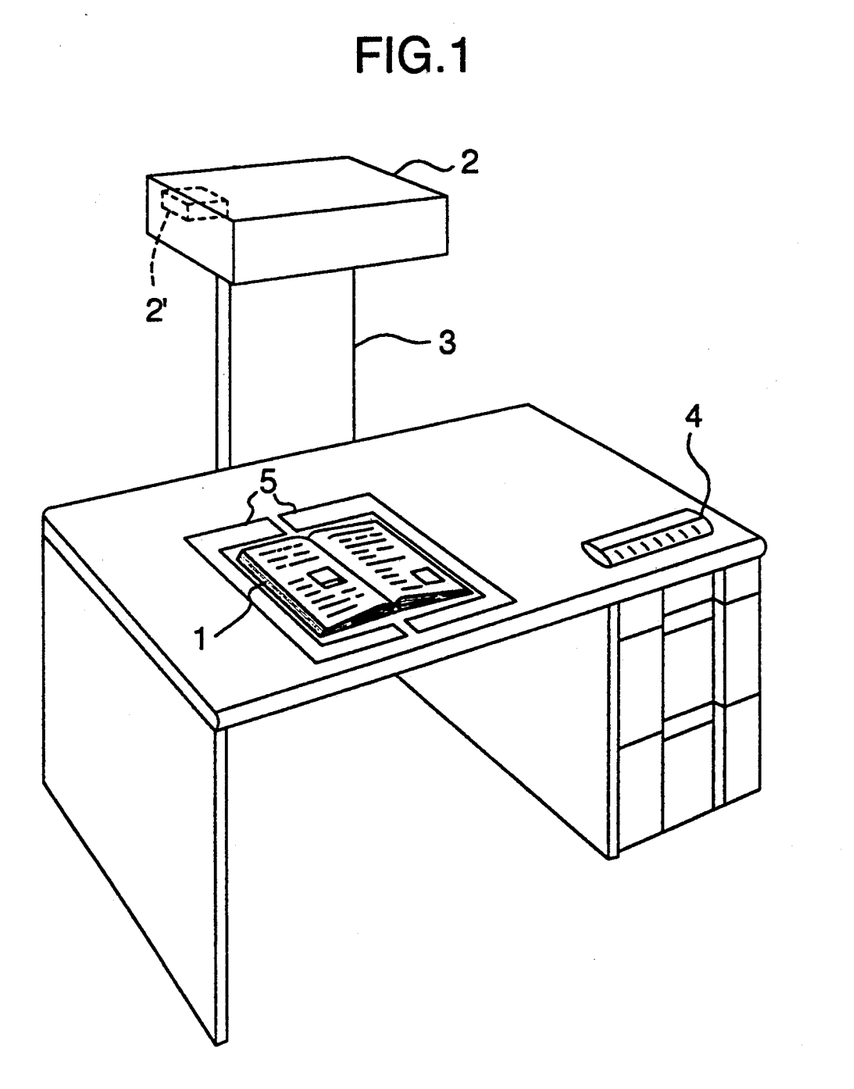
FIG. 1 shows an outward appearance of an image reading apparatus according to the present invention.

FIG. 1 shows the overall construction of a document reading apparatus according to the present invention. Whith this apparatus, a document 1 is placed face up on a document table, and a document reading section 2 is mounted in position for reading the document 1 form above. The reading section 2 is supported by a support column 3, with an appropriate distance between the document 1 and ready section 2. This distance is such as to allow visual recognition of at least a readable area over a document surface at all times, and provides a working space between the document 1 and reading section 2. The illustrated apparatus further comprises a control unit 2' and operating switches and the like 4 for controlling a document reading operation in a predetermined sequence.

Figure 2:
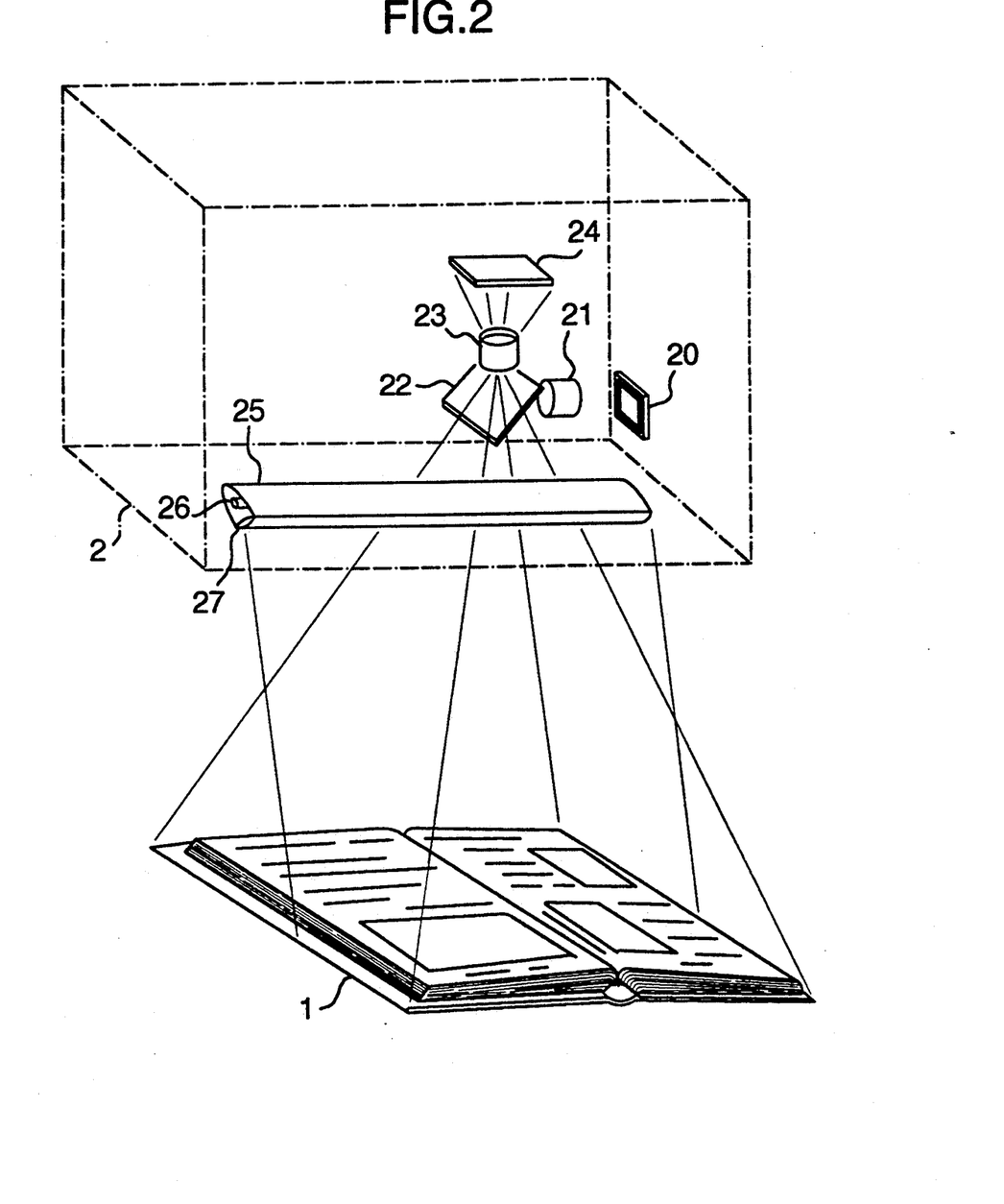
FIG. 2 is a perspective view of a reading section.

FIG. 2 shows details of the reading section 2. Image information from the document 1 is read by an image sensor 20 through a mirror 22 and an imaging lens 21. The image sensor 20 comprises a semiconductor optical/electrical converter such as a CCD, and may be an area sensor or a line sensor. The mirror 22 is movable between a position for a reading operation, as shown in FIG. 2, and a position for allowing a light beam to travel from the document 1 to a sensor 24 for detecting document curvatures and a document area. Detection of document curvatures by the sensor 24 means detection of the way or degree in which a document bound in book form is curved adjacent the joint. Detection of a document area means detection of an area in which the document is present out of a range covered by the image sensor 20. The sensor 24 may comprise an area sensor such as a CCD, and its sensitivity range corresponds to that of the image sensor 20.

A construction for detecting curvatures will be described with reference to FIGS. 2 through 4. In FIG. 2, a line beam source 25 acting as a curvature detector includes a linear light source 26 and a cylindricial lens 27. The line beam source 25 emits a line beam to the document 1 from above and at an angle thereto. The image of this line beam is projected through an imaging lens 23 to the sensor 24.

Figures 3A, 3B:
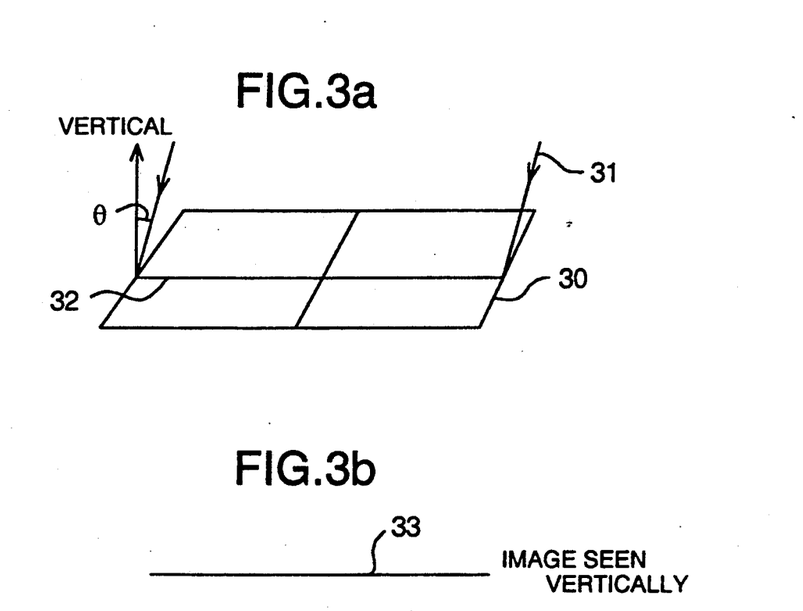
FIGS. 3a and 3b are explanatory views of curvature detection where a document is planar.

FIG. 3 shows the case of a planar document, wherein reference numeral 30 denotes the document, numeral 31 denotes the line beam from the light source 25, numeral 32 denotes the image of the line beam, and numeral 33 denotes the image thereof as seen by the sensor 24. Where the document 30 is planar, the image of the line beam as seen by the sensor 24 is straight.

Figure 4A:
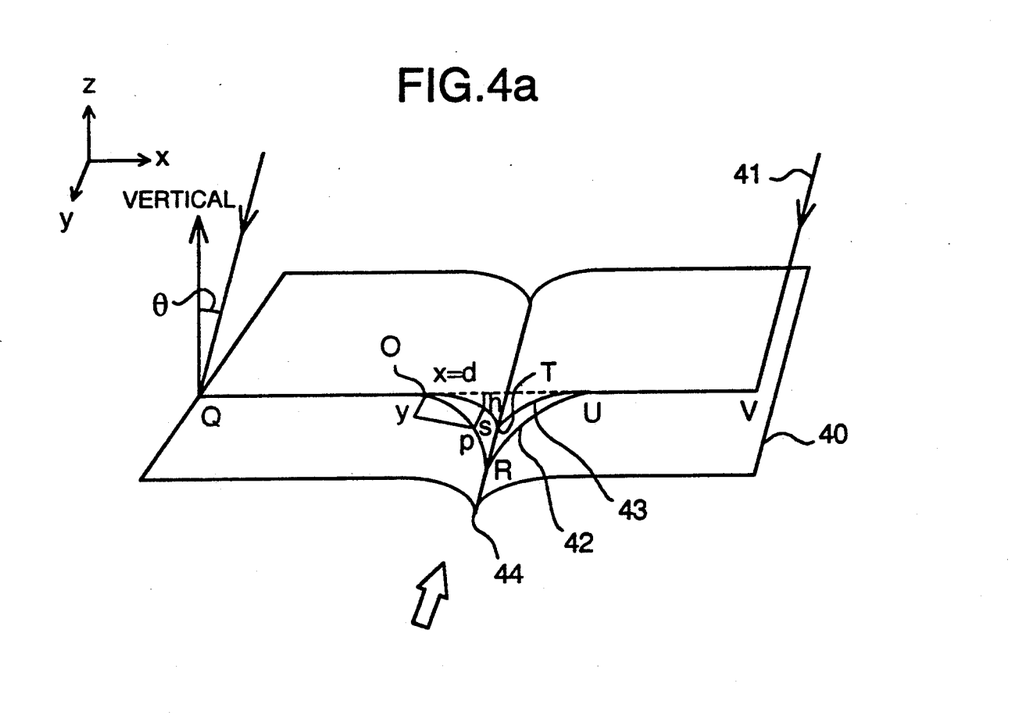
FIGS. 4a, 4b and 4c are explanatory views of curvature detection where a document is curved.
Figure 4B:
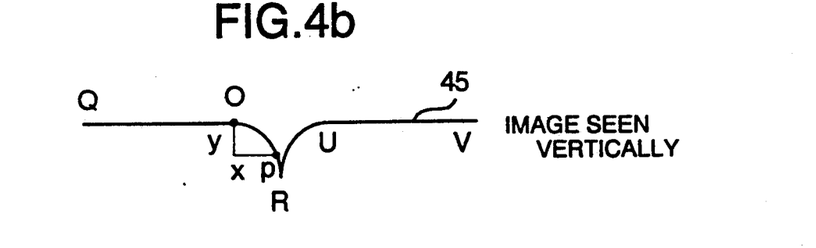
Figure 4C:
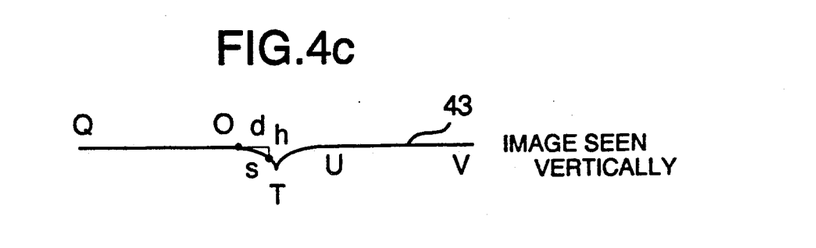

FIG. 4 shows the case of a curved document, wherein numeral 40 denotes the document curved in the direction of z-axis adjacent a joint 44. The line beam referenced 41 here forms a curved line 42 linking points Q, O, R, U and V in FIG. 4a. This curved line presents a curved line 45 in FIG. 4b as seen by the sensor 24. FIG. 4a shows a curved line 43 linking points Q, O, T, U and V. This curved line 43 starts at point Q as seen in the direction of an arrow, and extends through points on the document surface in the direction of x-axis. FIG. 4c shows the image of the curved line 43 as seen by the sensor 24. As seen from the curved line 43, the image data for point S should be an image data for a position at a distance OS from point O, but actually is a data for a position at a distance Od from point O when viewed from right above because the document is curved. In this way, the image of a curved portion of the document is compressed in the direction of x-axis, which would result in a blurred image. It is therefore necessary to expand the image in the direction of x-axis for reproduction. To determine the distance OS is adequate for this purpose, which may be derived by approximation as from $\sqrt{d^2+h^2}$.

The image actually obtained through the sensor 24 is the curved line 45, and the curved line 43 may be derived from the curved line 45. It may easily be derived from the following equation:

$$d = x, h = \frac{y}{\tan\theta}$$

where $\theta$ is an incident angle of the light beam 41 with respect to the vertical direction. Therefore, the image data for the point at a distance $d=x$ from point O in the direction of x-axis may be regarded for the purpose of reproduction as an image data for a point at a distance expressed by the following equation:

$$\sqrt{d^2 + h^2} = \sqrt{x^2 + \frac{y^2}{\tan^2\theta}}$$

Although, in this case, spacing between pixels increases in the direction of x-axis, an average value or the like may be interpolated. In the case of a small curvature, namely where the value of h is small, the image is compressed only to a minor extent which requires no image expanding operation.

It will be appreciated that the mirror 22 in FIG. 2 may comprise a fixed half mirror instead of being movable. Further, where the light source 25 comprises an infrared source, the mirror 22 may comprise what is known as a cold mirror which transmits infrared light only and reflects visible light. The image sensor 20 may be used as the sensor 24 also.

Figure 5:
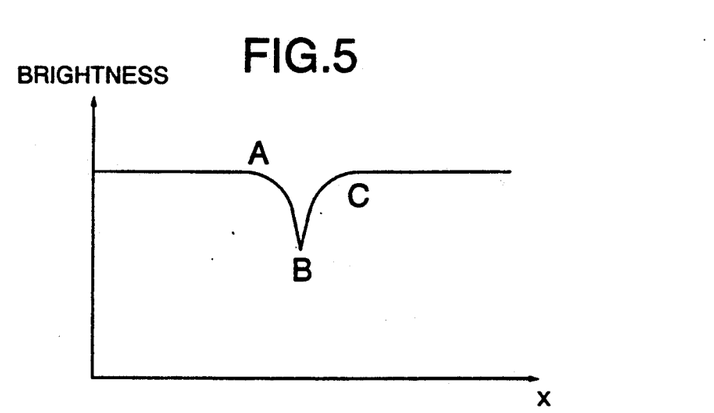
FIGS. 5 is a view showing a brightness distribution.

The way in which the brightness variations due to the curvature are rectified will be described next. FIG. 5 shows a brightness distribution occurring in the direction of x-axis when the projected image of the light source 25 as monitored through the sensor 24 takes the form of the curved line 45 in FIG. 4b. It is assumed here that the document is monochromatic, e.g. white. In FIG. 5, the curved line AC corresponds to the curved portions of the document, and point B to the joint thereof. Brightness rectification may be effected based on the brightness distribution curve shown in FIG. 5, to render the brightness distribution uniform, that is to obtain a straight line ABC, for reproduction. The curve shown in FIG. 5 may be obtained from a brightness distribution through top or bottom margins of the document which usually include no characters or pictures. This may be achieved by obtaining data for several lines corresponding to the top or bottom margins when the sensor 24 picks up the image of the light source 25, and obtaining data for the lines among the several lines that display the distribution as shown in FIG. 5.

Figure 6:
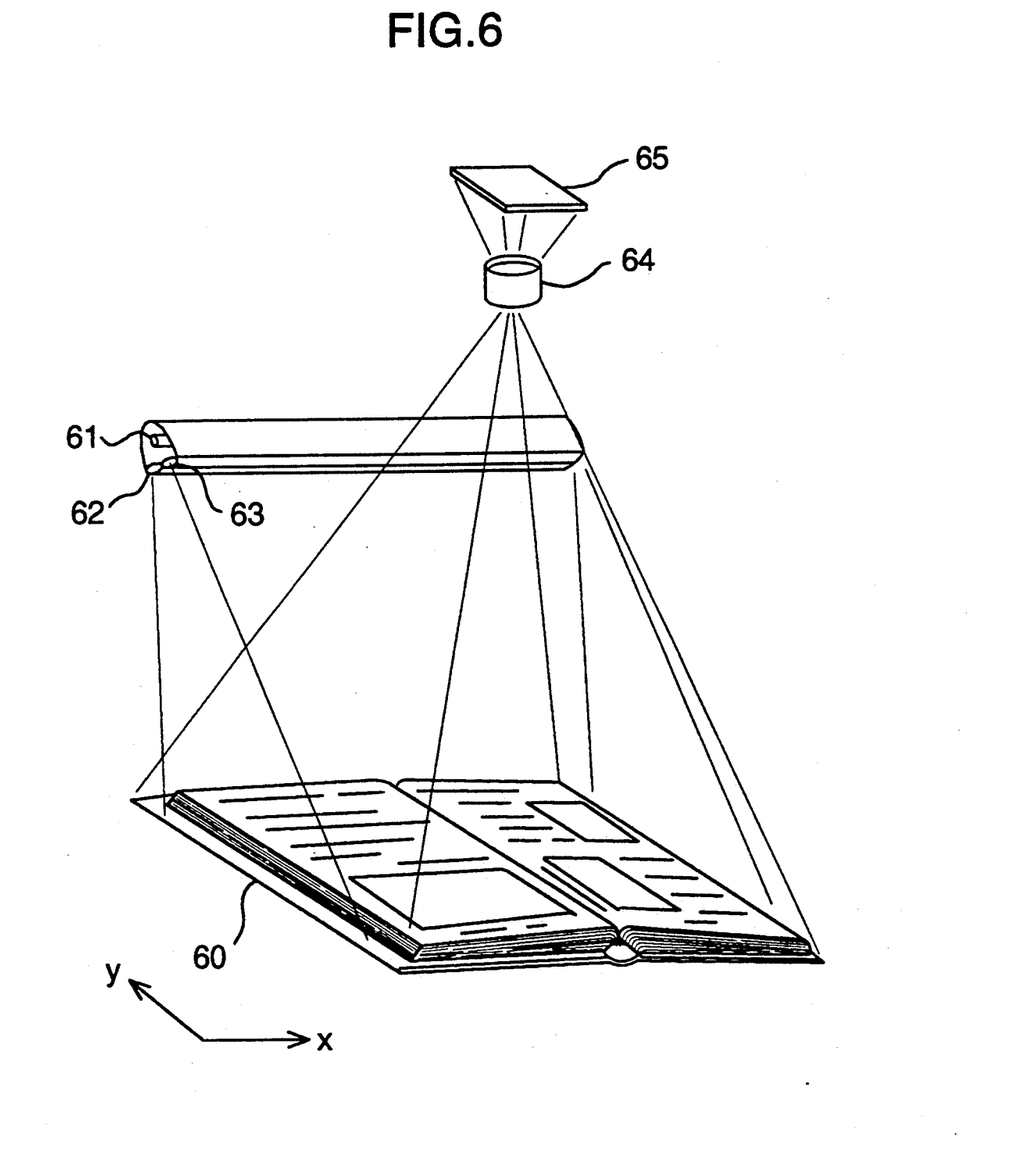
FIG. 6 is a perspective view of a curvature detecting construction utilizing a plurality of light beams.

FIG. 6 shows another embodiment which carries out curvature detection by utilizing two light beams. This embodiment includes a linear light source 61 and two cylindrical lenses 62 and 63 for emitting two light beams to a document 60. Reflections of these two light beams travel through an imaging lens 64 to a sensor 65. This embodiment emmploys a curvature detecting method similar to the method employed in the preceding embodiment. According to this method, curvatures may be detected by means of two different lines extending in the direction of x-axis in FIG. 6. It is therefore possible to infer curvatures in the direction of y-axis as well from the two data such as by linear interpolation.

Figure 7:
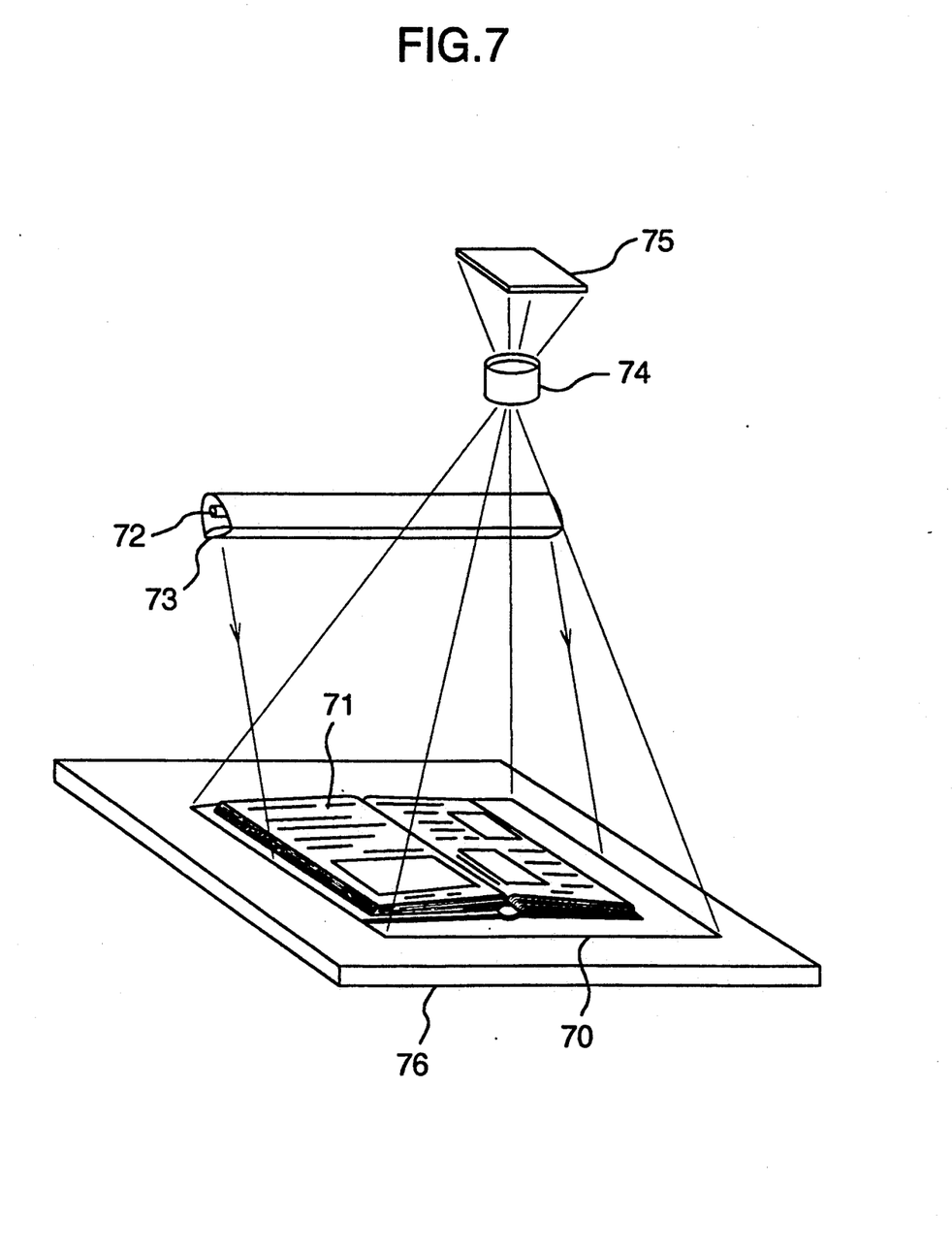
FIG. 7 is a perspective view of a construction for detecting an image pickup area.

A construction for detecting the document area will be described next with reference to FIG. 7. A line 70 in FIG. 7 defines an area on a document table 70 which may be picked up by an image sensor. This area is covered by an infrared absorber not shown. A linear infrared light source 72 emits an infrared line beam through a cylindrical lens 73 to a document 71. The image of reflected light is projected through a lens 74 to an area sensor 75.

Figure 8:
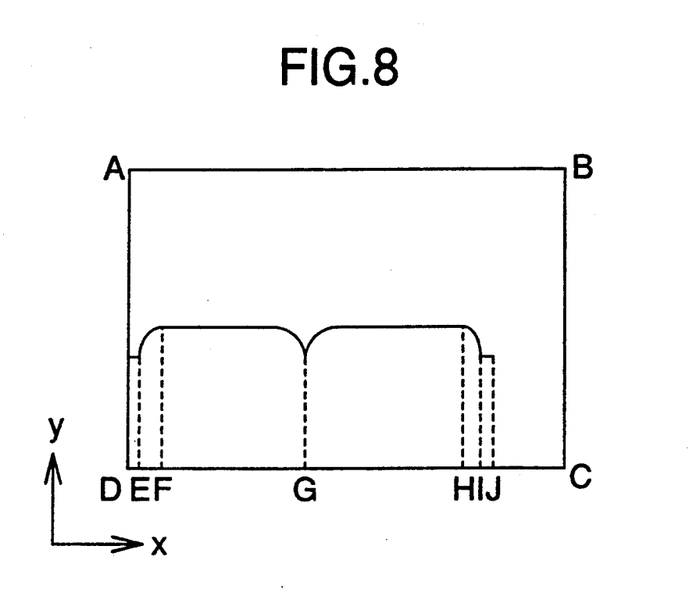
FIGS. 8 and 9 are views showing image pickup areas, respectively.

FIG. 8 shows an image obtained by the infrared radiation according to the above construction. In FIG. 8, a square ABCD represents the image pickup area, and a curved line DJ represents the image. Reference G denotes a joint of the document in book form, a range marked FGH in the direction of x-axis represents a document surface, and references DEF and HIJ correspond to opposite marginal regions. There appears no image between J and C because the document is absent from this area, and the infrared light emitted is absorbed by the infrared absorber covering the document table. It will be seen from FIG. 8 that the area lying between D and J corresponds to a document area in the direction of x-axis and, strictly speaking, the area between F and H is a material portion of the document. Similarly, a document area in the direction of y-axis may be detected by providing a linear light source extending in the y direction and observing the image thereby produced.

Figure 9:
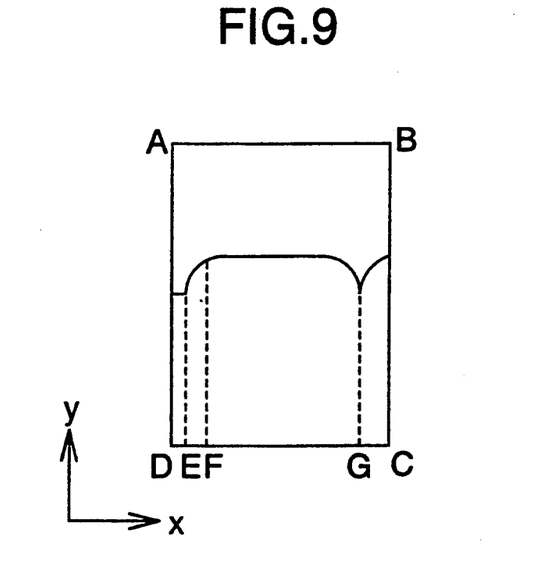

In the above example, the entirety of opened pages of a book may be picked up by the sensor. FIG. 9 shows an image produced by the infrared radiation where only a single page can be monitored. In FIG. 9, reference G denotes the joint of a book, the area between D and G corresponds to a document area, and, to be precise, the area between F and G is a material portion of the document.

Although the described construction employs an infrared source, a visible light source may be used instead, with the infrared absorber replaced by a visible light absorber. The image sensor may be used also as a document area detecting sensor. Further, the document area may be detected by using ambient illumination instead of the special light source and checking a distribution of reflected light within the image pickup area.

Figure 10:
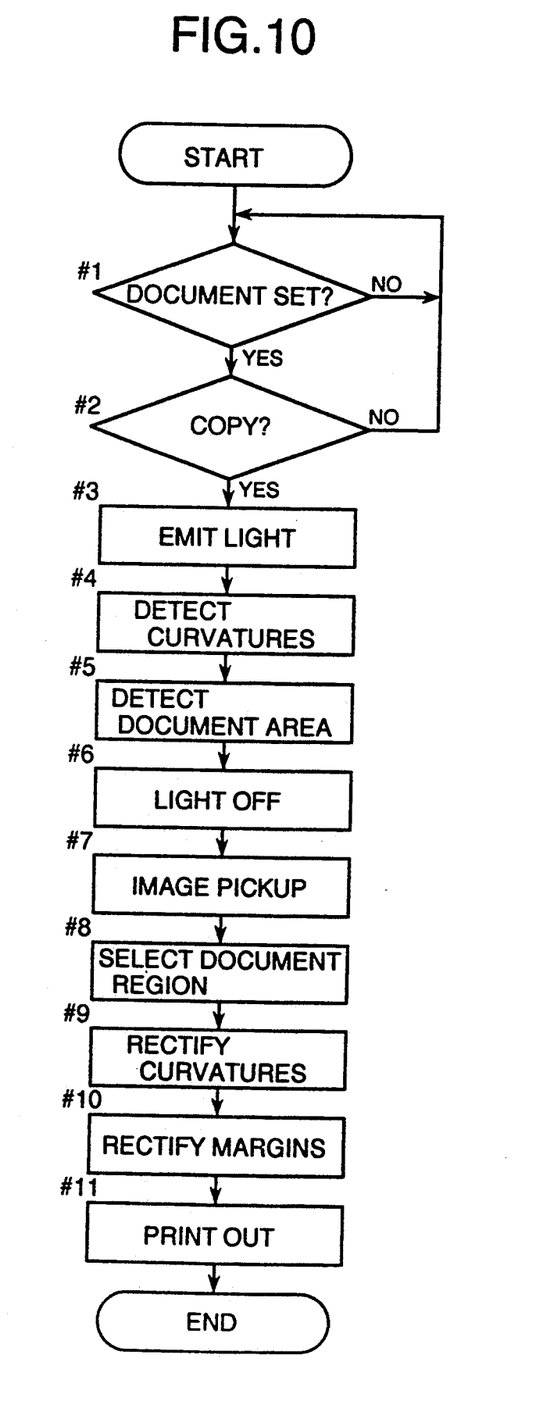
FIG. 10 is a flowchart illustrating an image copying operation.

FIG. 10 shows a flow of successive copying steps taken with the document reading apparatus according to the present invention. The user sets a desired document in position within the image pickup area monitored by the image sensor (step #1). Then a copy button is pressed at step #2. When the copy button is pressed, the light beam or beams are emitted at step #3 for enabling detection of document curvatures and a document area. The document curvatures and document area are detected based on the image produced by the light beam or beams at steps #4 and #5. Next, the light beam or beams are turned off at step #6, and the image is picked up at step #7. Upon completion of the image pickup and required detecting operations, only image data for the document area is selected at step #8, which is based on the detection made at step #5. Subsequently, based on the detection made at step #4, the compressed image resulting from the document curvatures is rectified at step #9. Then, at step #10, portions of the document, usually lateral ends of the document, regarded as pressed by the user's thumbs and fingers are rectified for conformity with a color of surrounding areas. The copying operation ends with a printout made at step #11.

Figure 11:
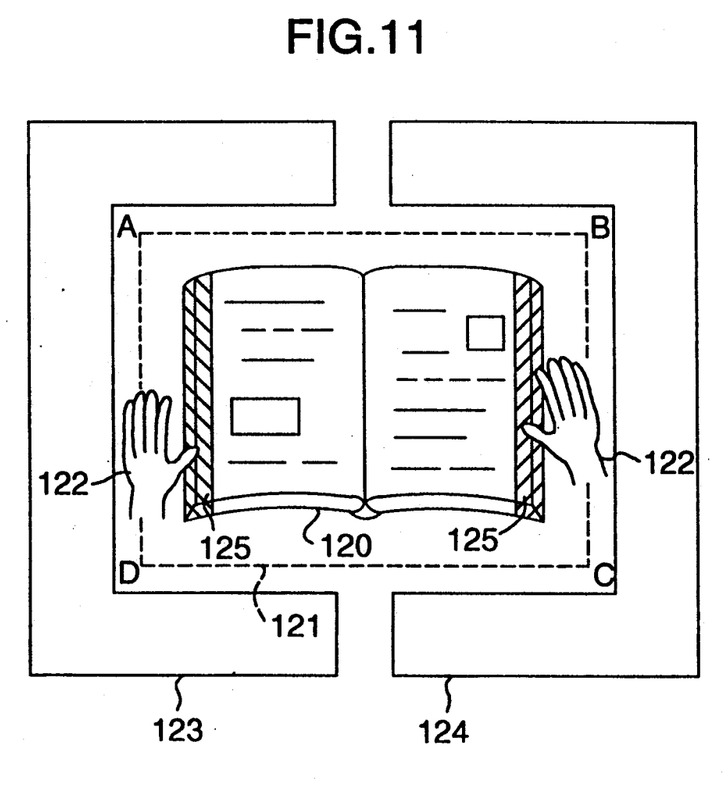
FIG. 11 is a plan view showing copy buttons and a way in which a document is held in position.

FIG. 11 is an explanatory view showing copy buttons and a way in which the portions of a document pressed by the user are rectified. In FIG. 11, a square ABCD surrounding a document 120 on the document table and marked by a broken line 121 represents an area picked up by an image sensor not shown. Reference numeral 122 indicates the user's hands pressing the document 120. When the image is read in this state, the user's thumbs lying in the document area are included in the image, thereby impairing the quality of a reproduced image. The reproduction image quality may be imnproved by extracting the document area and thereafter reproducing, in a uniform single color, selected marginal regions at opposite sides of the document such as hatched portions 125 in FIG. 11. The color in which such marginal regions are reproduced may correspond to the color of paper used for printing the image, the color of the document adjacent the rectified regions, or the color appearing most frequently in the image data.

Figure 12A:
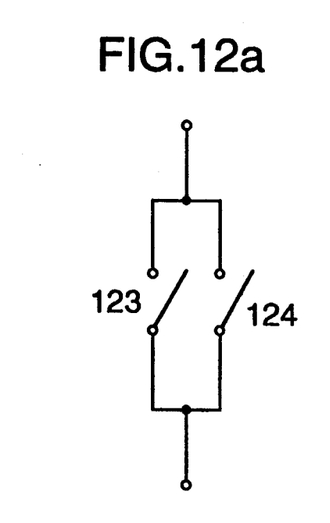
FIGS. 12a and 12b show ways in which the copy buttons are connected, respectively.
Figure 12B:
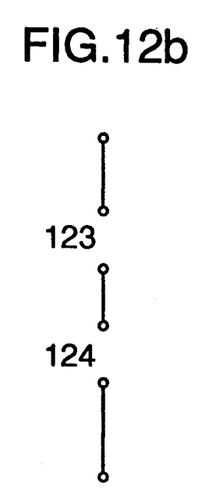

As shown in FIG. 11, copy buttons 123 and 124 are arranged on the document table. These buttons 123 and 124 comprise switches in sheet form which turn on by being pressed at any positions thereof. The switches arranged around and adjacent the image pickup area allow the user to press one of the switches by extending thereto a finger of a hand holding the document 120 in position, thereby assuring an improved operating efficiency. As shown in FIG. 12a, the switches 123 and 124 may be connected parallel to each other, so that the apparatus is operable by pressing any one of them. Alternatively, the switches 123 and 124 may be connected in series as shown in FIG. 12b, so that the apparatus is operable only when both are pressed simultaneously. The latter is useful as a countermeasure against pressing of the switches by mistake.

In the described embodiments, the image sensor 20 acting as the document reader may also be used as the sensor 24 for monitoring the projected image. This reduces the number of components and manufacturing cost. As described above, document curvatures are determined by variations in the height of the document surface obtained by triangulation or range finding based on phase shift. Such a direct mode range finding assures high precision. Curvature detection made by means of a plurality of line beams has the advantage of being able to detect two-dimensional curvatures.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document reading apparatus comprising:
   document reading means for reading a document and outputting an image signal;
   light emitting means for emitting light to said document;
   detecting means for detecting an image of the light emitted from said light emitting means to said document and for judging curvatures of said document; and
   rectifying means operable in response to said detecting means for rectifying said image signal received from said document rading means.

2. A document reading apparatus of claimed in claim 1, wherein said document reading means is disposed above said document.

3. A document reading apparatus as claimed in claim 1, wherein said light emitting means includes a light source and a cylindrical lens.

4. A document reading apparatus as claimed in claim 1, further comprising brightness distribution detecting means for detecting a brightness distribution of said document.

5. A document reading apparatus as claimed in claim 4, wherein said rectifying means is operable in response to said brightness distribution detecting means for rectifying said image signal received from said document reading means.

6. A document reading apparatus as claimed in claim 1, further comprising a document table including a light absorber for absorbing the light emitted from said light emitting means, and document area detecting means operable in response to said detecting means for detecting a document area.

7. A document reading apparatus as claimed in claim 6, wherein said light emitting means is operable for emitting infrared light.

8. A document reading apparatus as claimed in claim 6, wherein said light emitting means is operable for emitting visible light.

9. A document reading apparatus as claimed in claim 1, further comprising reproducing means for reproducing the image signal from said document reading means on recording paper.

10. A document reading apparatus as claimed in claim 9, wherein said rectifying means is operable for rectifying said image signal to cause selected marginal ranges at opposite sides of the document to be reproduced in a selected color.

11. A document reading apparatus as claimed in claim 10, wherein said selected color is a color of the recording paper.

12. A document reading apparatus as claimed in claim 10, wherein said selected color is a color of the document.

13. A document reading apparatus as claimed in claim 1, further comprising startup means disposed adjacent the document for starting said document reading means.

14. A method of reading a document comprising the steps of:
   emitting light to said document;
   generating an image signal corresponding to said document;

deriving curvatures of said document from said image of the light emited to said document; and rectifying said image signal based on the curvatures of the document.

15. A method as claimed in claim 14, further comprising the steps of:

detecting a brightness distribution of the document from said image of the document detected; and rectifying said image information of the document based on the brightness distribution of the document.

* * * * *